United States Patent [19]
Ikeda et al.

[11] Patent Number: 5,363,817
[45] Date of Patent: Nov. 15, 1994

[54] VALVE OPERATION TIMING REGULATION APPARATUS FOR INTERNAL COMBUSTION ENGINES

[75] Inventors: Hiroshi Ikeda; Katsuhiko Kawai, both of Kariya, Japan

[73] Assignee: Nippondenso Co., Ltd., Kariya, Japan

[21] Appl. No.: 216,544

[22] Filed: Mar. 23, 1994

[30] Foreign Application Priority Data

Mar. 25, 1993 [JP] Japan .................................. 5-066898

[51] Int. Cl.⁵ .............................................. F01L 1/34
[52] U.S. Cl. ............................... 123/90.15; 123/90.17
[58] Field of Search ............... 123/90.15, 90.16, 90.17, 123/90.31

[56] References Cited

U.S. PATENT DOCUMENTS

| | | | |
|---|---|---|---|
| 4,909,194 | 3/1990 | Bauer | 123/90.15 |
| 4,995,351 | 2/1991 | Ohkubo et al. | 123/90.15 |
| 5,103,780 | 4/1992 | Ishii | 123/90.17 |
| 5,184,578 | 2/1993 | Quinn, Jr. et al. | 123/90.17 |
| 5,222,465 | 6/1993 | Sakamoto et al. | 123/90.17 |
| 5,245,968 | 9/1993 | Kolias et al. | 123/90.15 |
| 5,289,805 | 3/1994 | Quinn, Jr. et al. | 123/90.17 |

FOREIGN PATENT DOCUMENTS

4228813 8/1992 Japan .

*Primary Examiner*—E. Rollins Cross
*Assistant Examiner*—Weilun Lo
*Attorney, Agent, or Firm*—Cushman, Darby & Cushman

[57] ABSTRACT

A valve operation timing regulation apparatus for changing the operation timing of the intake valve, etc., of internal combustion engine, in which the controllability is improved by avoiding operation variations of a value actuator. The rotational phase angle difference between the crankshaft and the camshaft is changed by driving a member interposed between the two shafts. A target value of the rotational phase angle difference is determined and an actual value measured by detecting operating conditions at various parts of the engine. The control deviation between the target and the actual value is calculated, so that a control unit decides a present control value of the actuator, by selecting on the basis of the error and past control values, one of a plurality of control values predetermined in a region free of unfavorable influences of actuator characteristic variations.

5 Claims, 8 Drawing Sheets

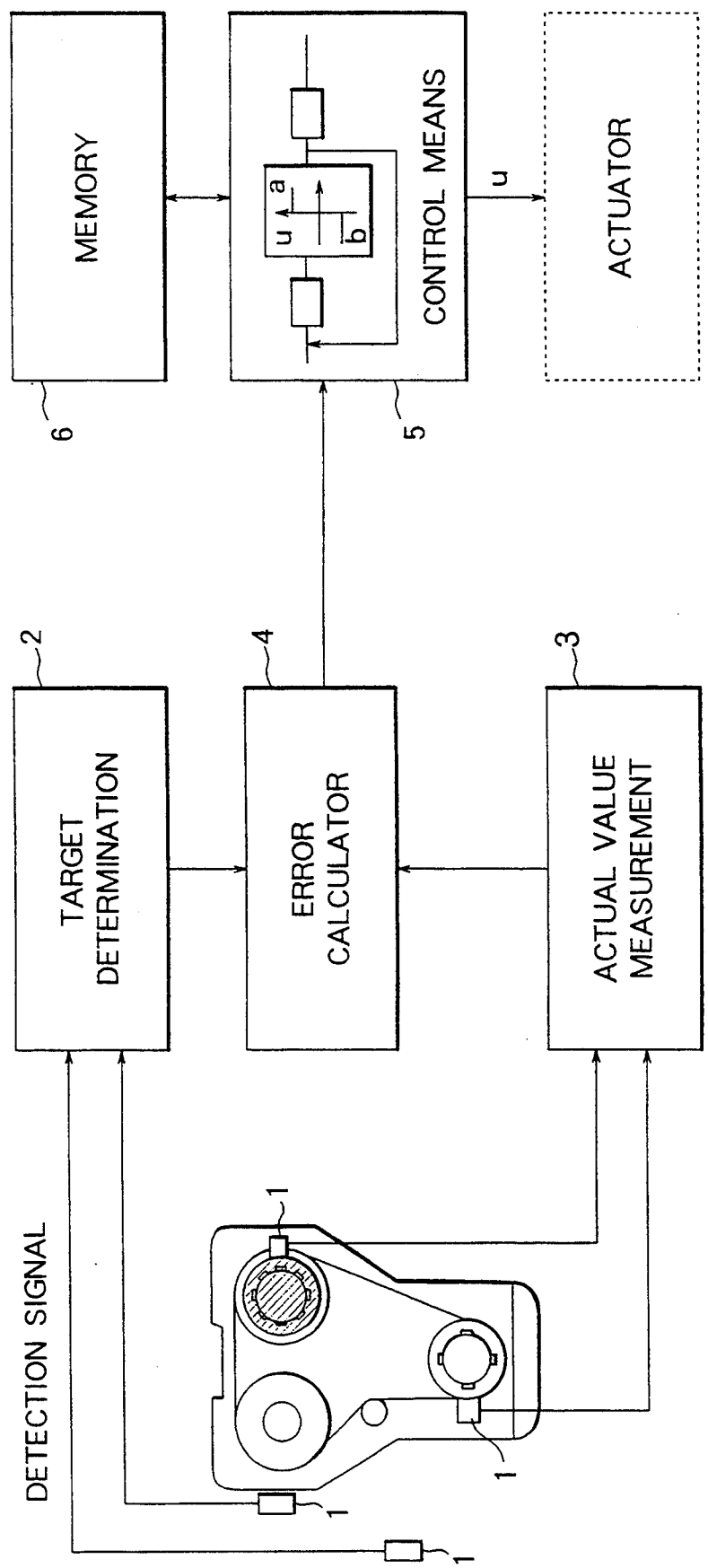

FIG. 4
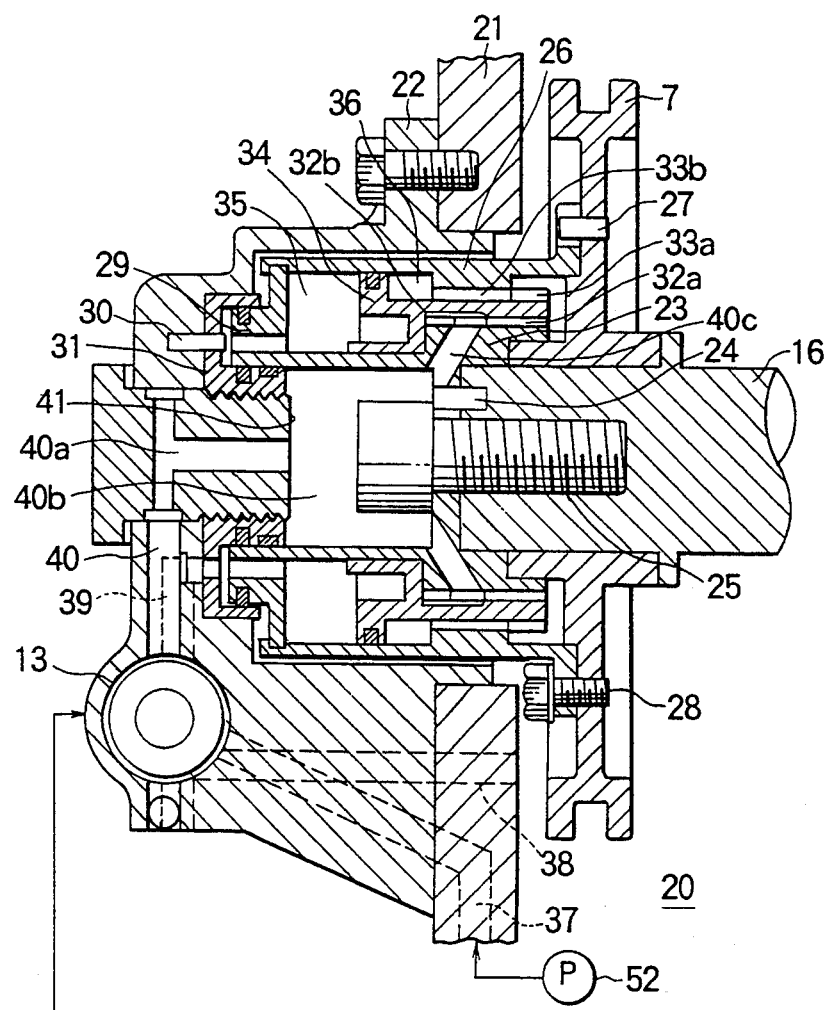
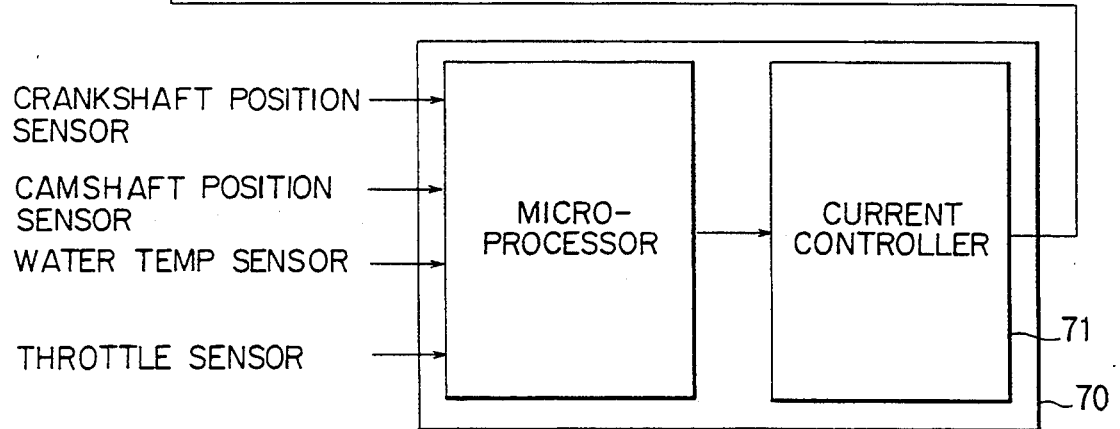

VALVE OPERATION TIMING REGULATION APPARATUS FOR INTERNAL COMBUSTION ENGINES

BACKGROUND OF THE INVENTION

Field of the Invention

The present invention relates to a valve operation timing regulation apparatus to change the operation time of the intake valve and the exhaust valve of the internal combustion engine.

Description of the Related Art

The valve operation timing regulation apparatus (hereinafter referred to as "the valve operation regulation system" in abbreviation) is used for advance control to advance or retard the operation time of the intake valve and the exhaust valve. Such an apparatus comprises a phase-adjusting member fitted between the crankshaft and the camshaft. The phase-adjusting member is slid by a hydraulic unit to change the rotational phase between the two shafts and thus to change the operation time of the intake valve and the exhaust valve driven by the rotor on the camshaft. This operation uses feedback control, in which the opening degree of the solenoid valve of the hydraulic unit is controlled to adjust the hydraulic pressure for sliding the phase-adjusting member. A typical control system is shown in FIG. 2.

In FIG. 2A, reference numeral 101 designates a common controller, and numeral 102 an object of control providing a hydraulic unit. This control system exemplifies the manner in which an operation value u as for a target cam advance r is generated as a duty factor and applied to the solenoid valve of the hydraulic unit, so that the phase between the crankshaft and the camshaft is finally changed and the cam advance y between the two shafts is outputted.

The object of control 102 includes what is called the integrating elements in view of the fact that the quantity of the operating oil in the hydraulic unit is adjusted by regulating the solenoid valve opening. Experiments show that a "dead time" exists between the input and output. The dynamic characteristic of this object is approximated by "integration+dead time". The object of control including the static characteristic of the solenoid valve is shown in FIG. 2B.

This static characteristic has a dead band. The right shoulder of the characteristic curve is called an advance duty factor da and the left shoulder a retardation duty factor dr. The former is the value associated with the sliding motion of the phase-adjusting member, i.e., the actual start of advancing and the latter represents the value taken when the retardation is initiated. These duty factors da, dr are measured in advance according to the conditions including the hydraulic pressure capacity and the driving force of the phase-adjusting member, and are used as the elements for generating the operation value u in the controller.

The solenoid valve, as shown by the dotted line in FIG. 2B, causes variation d in the dynamic characteristic due to the manufacturing error and secular variations. The result causes the problem that the advance duty factor da and the retardation duty factor dr change thereby to deteriorate the accuracy and controllability of the operation timing of the intake valve and the exhaust valve. An attempt to minimize the manufacturing error of the solenoid valve to reduce the variations thereof would increase the cost and is therefore industrially limited. The advance rate in the dead band zone between the advance duty factor da and the retard duty factor dr cannot be held exactly at zero due to a slight leakage of hydraulic oil, etc. This makes it impossible to hold the camshaft advance even when the duty factor is set at an intermediate point.

SUMMARY OF THE INVENTION

The present invention, in view of the fact that the saturation region of the camshaft advance rate shown in FIG. 2B is not affected by the variations of the solenoid operation, is intended to solve the above-mentioned problem by adapting a control rule generally called "bang-bang control" to the regulation of the valve operation timing.

According to an aspect of the invention, as shown in FIG. 1, there is provided a valve operation timing regulation apparatus, wherein a member interposed between the crankshaft and the camshaft in the internal combustion engine is driven by an actuator, and by thus changing the rotational phase between the two shafts, the timing of the operation of the valve driven by the camshaft is changed, the operating conditions of the internal combustion engine are determined on the basis of a detection signal from various sensors 1 for sensing the various parts of the internal combustion engine, a target value of the rotational phase is determined in accordance with the operating conditions thus detected, the actual value of the rotational phase is measured on the basis of the detection signal from the sensors, and the error is calculated on the basis of the target value and the actual value. Control means 5 is adapted to determine one control value from a plurality of control values selected from the region associated with stable operation of the actuator, and the resulting control value is applied to the actuator. A memory 6 is for storing the control value generated in this way or the control amount based on the control value.

The control means 5 decides on the present control condition using the error calculated by the error calculation means 4 and the control value or the control amounts previously stored in the memory 6, and selectively produces a control value on the basis of the present control condition.

Generally, the bang-bang control has a control rule as shown in equation (1). In the apparatus according to the invention, however, in order to realize such a control by digital computer, the control rule of discrete time system is used as expressed in equation (2).

$$u(t) = \begin{cases} +1 & \text{when } g(t) > 0 \\ -1 & \text{when } g(t) < 0 \end{cases} \quad (1)$$

where t is the time, u(t) the operation amount, and g(t) the switching condition.

$$u(k) = \begin{cases} a & \text{when } s(k) \geq 0 \\ b & \text{when } s(k) < 0 \end{cases} \quad (2)$$

where k is the sampling time point, a, b constants, and s(k) the switching condition.

According to the above-mentioned configuration, the control value produced from the control means 5 toward the actuator is not a continuous value, but the variations due to the manufacturing error or secular variations of the actuator are set as a fixed value from the saturation region having no effect on the controllability of the valve operation timing. The control value is continuously produced from the control means 5 at short intervals of time. The present control condition is estimated by the control means 5 from the error of the present rotational phase and the control amount for the previous control, and the result of estimation is used to selectively produce one of a plurality of control values. Therefore, the valve operation timing is controlled without being affected by the variations of the actuator operation. At the same time, the tracking control is effected while taking the integrating elements of the control system into consideration, thereby realizing a valve operation timing control high in accuracy over the whole control operation range.

BRIEF DESCRIPTION OF THE DRAWINGS

FIG. 1 is a block diagram showing an embodiment of the valve operation timing regulation apparatus according to the present invention.

FIG. 4 is a sectional view showing a valve timing regulation mechanism for the regulation apparatus shown in FIG. 3.

DESCRIPTION OF THE PREFERRED EMBODIMENTS

A valve operation timing regulation apparatus according to an embodiment of the invention will be explained with reference to the accompanying drawings.

Figure 2A:
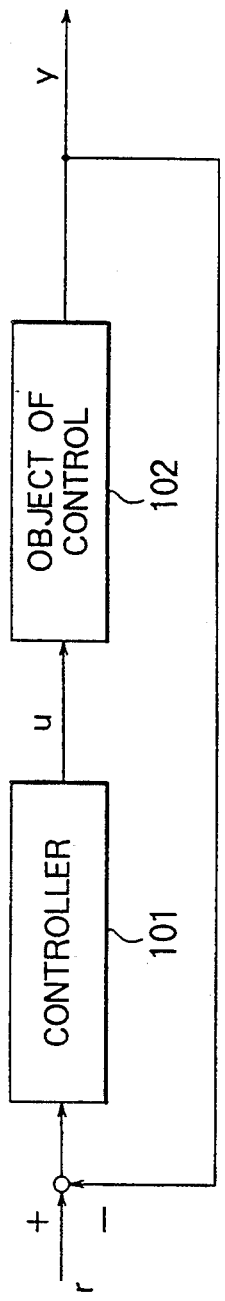
FIG. 2A is a block diagram showing an ordinary control system for the valve operation timing regulation apparatus.
Figure 2B:
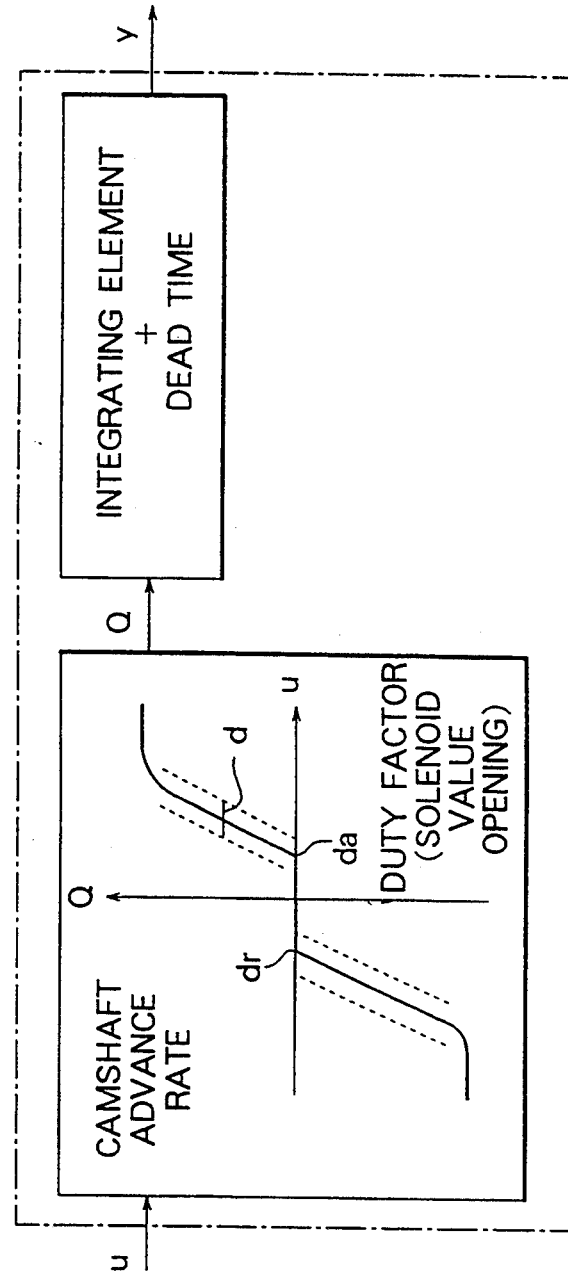
FIG. 2B is a block diagram showing an object of control by the control system.
Figure 3:
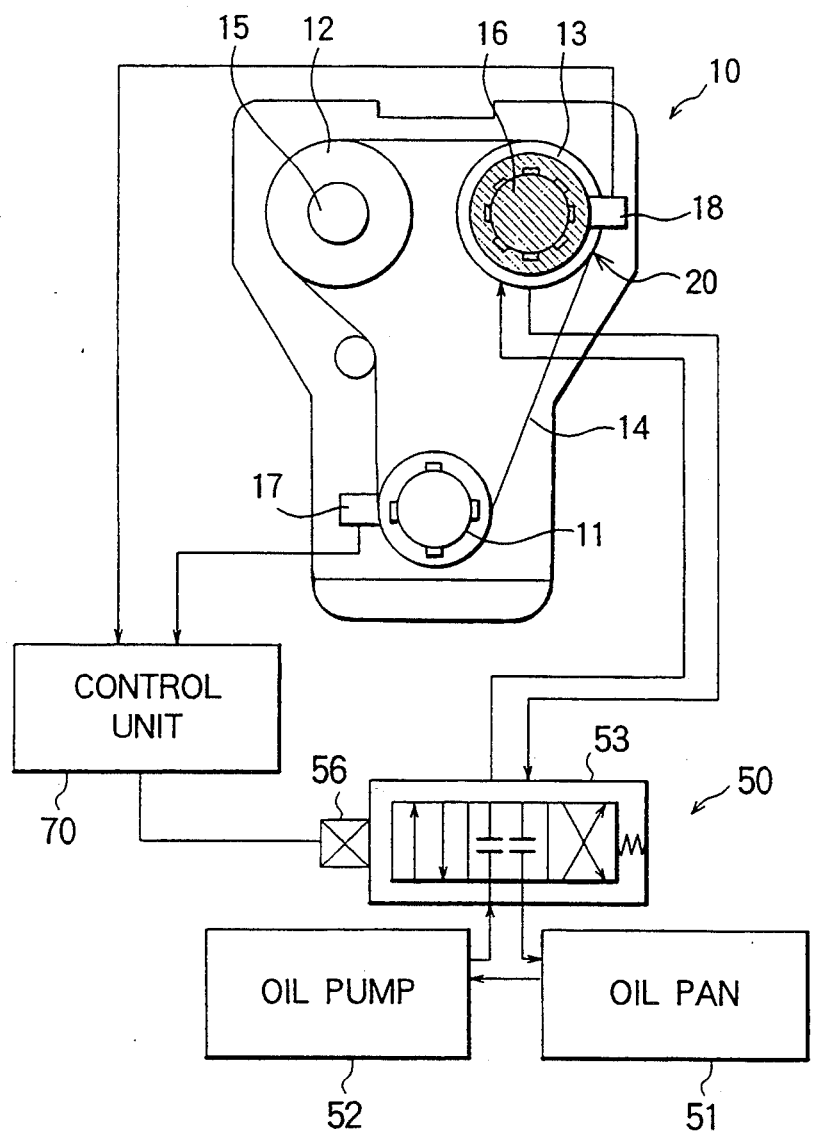
FIG. 3 is a diagram showing an embodiment of the valve operation timing regulation apparatus according to the invention.

FIG. 3 is a diagram showing a configuration of the apparatus according to the invention as applied to the double overhead camshaft type engine. In FIG. 3, numeral 10 designates an engine body, numeral 20 a valve timing regulation mechanism (hatched portion) disposed in the engine 10, numeral 50 a hydraulic unit for driving the regulation mechanism 20, and numeral 70 a controller for determining the operating conditions of the engine from signals produced by various sensors mounted on the engine 10 and applying a control signal to the hydraulic unit 50.

In the engine 10, a timing chain 14 is hung between the crankshaft 22, an exhaust valve sprocket 12 and an intake valve sprocket 13, so that the rotational effort of the crankshaft 11 is imparted to the exhaust valve camshaft 15 and the intake valve camshaft 16, as schematically shown.

This embodiment comprises the regulation mechanism 20 between the sprocket 13 and the camshaft 16. The regulation mechanism 20 is slid toward the camshaft rotation shaft to change the rotational phase between the sprocket 13 and the camshaft 16, thus controlling the advance of the intake valve. Of course, the regulation mechanism 20 may alternatively be mounted on the exhaust valve side or on each side for performing similar control.

A crankshaft position sensor 17 is mounted in the vicinity of the crankshaft 11, and a camshaft position sensor 18 in the vicinity of the camshaft 16. These sensors are made up of an electromagnetic pickup sensor, for example. The sensors 17, 18 apply a pulse signal to the controller 70 with the rotation of the shafts 11, 16. The position sensor 17 generates a number N of signals per crankshaft revolution, while the position sensor 18 generates a number 2N of signals per camshaft revolution. The controller 70 measures the rotational phase 8 between the crankshaft 11 and the camshaft 16 on the basis of these signals. The character N is set in such a manner to hold the relation $N < 360/\Theta_{MAX}$ where $\Theta_{MAX}$ is the maximum value of the rotational phase angle.

The controller 70, which is combined with an electronic control unit (ECU) for controlling the air-fuel ratio and the idle rotation, actually includes a CPU, a RAM, a ROM, an input-output circuit and a current control circuit 71. In addition to these signals, the controller 70 retrieves an engine cooling-water temperature signal, a throttle opening degree signal, etc, determines a target value by the control operation described later, and applies a control signal to a linear solenoid for driving the spool valve in the hydraulic unit 50.

Now, the valve timing regulation mechanism 20 will be explained with reference to FIG. 4.

FIG. 4 is a sectional view showing the coupled relation between the regulation mechanism 20, the sprocket 13 and the camshaft 16. The regulation mechanism 20 is constructed in a housing 22 fixed on the cylinder 21 of the engine 10.

The end of the camshaft 26 extending leftward is fixed with a substantially cylindrical camshaft sleeve 23 by a pin 24 and a bolt 25. A sprocket 13 is fitted on the portion of the sleeve 23 supporting the camshaft 16, so that the motion along the rotational axis is blocked while allowing the sliding motion along the rotational direction. The sprocket 13, on the other hand, is fixed with a substantially cylindrical sprocket sleeve 26 by a pin 27 and a bolt 28, and the other end of the sleeve 26 is fixed with an end plate 29. In this way, the sleeve 23 is integrated with the camshaft 16, and the sleeve 26 with the sprocket 13 in such a manner as to be rotatable in a ring plate 31 fixed on the housing 22 with a knock pin 30.

An outer peripheral portion of the camshaft sleeve 23 is formed with an outer-tooth helical spline 32a, and an inner peripheral portion of the sprocket sleeve 26 with an inner-tooth helical spline 33a. A cylinder 34 is fitted between the sleeves 23 and 26. The helical splines 32a, 33a of the sleeves 23, 26 are in mesh with the inner-tooth helical spline 32b formed on the inner periphery of the cylinder 34 and the outer-tooth helical spline 33b formed on the outer periphery of the cylinder 34, respectively. As a result, the sleeves 23, 26 are rotated integrally with the cylinder 34, so that the turning effort of the sprocket 13 is transmitted to the camshaft 16. With the sliding of the cylinder 34 along the rotational axis under this engagement, a thrust force is generated in the engaged portions of the helical splines. This thrust force causes the camshaft 16 to slide along the rotational direction of the sprocket 13, thereby changing the rotational phase between the sprocket 13 and the camshaft 16.

The embodiment under consideration uses a hydraulic unit 50 for driving the cylinder 34, and for this purpose, two hydraulic chambers 35, 36 are formed in the region covered by the sleeves 23, 26 in the regulation mechanism 20. In FIG. 4, the hydraulic chamber 35 for advancing operation is located on the left side, and the hydraulic chamber 36 for retarding operation on the right side. The cylinder 34 is adapted to slide axially in accordance with the amount of the operating oil supplied into the hydraulic chambers 35, 36. The regions forming the hydraulic chambers 35, 36 are covered with an oil seal appropriately.

The hydraulic unit 50 includes an oil pan 51 (FIG. 3) for storing the operating oil, a hydraulic pump 52 driven by engine power, a spool valve 53 for distributing the operating oil, supplied under pressure from the hydraulic pump 52, between the hydraulic chambers, and a hydraulic passage communicating between these component parts. In FIG. 4, numeral 37 designates a hydraulic passage between the hydraulic pump 52 and the spool valve 53, numeral 38 a hydraulic passage between the spool valve 53 and the oil pan, numeral 39 a hydraulic passage between the spool valve 53 and the hydraulic chamber 35, and numeral 40 a hydraulic passage between the spool valve 53 and the hydraulic chamber 36. The route of the hydraulic passage 40 runs from a T-shaped communicating passage 40a formed in the bolt 41 for fixing the ring plate 31 on the housing 22 through the region 40b surrounded by the bolt 41 and the camshaft sleeve 23, through a hydraulic passage 40c formed in the camshaft sleeve 23 to the hydraulic chamber 36.

Now, the operation of the spool valve will be explained with reference to FIG. 5.

In FIG. 5, numeral 54 designates a cylinder, numeral 55 a spool adapted to slide in the cylinder 54, numeral 56 a linear solenoid for causing the spool 55 to slide in response to a control signal from the controller 70, and numeral 57 a spring for urging the spool 55 in the direction opposite to the driving force of the linear solenoid 56. The cylinder 54 is formed with an operating oil supply port 58 communicating with a hydraulic pump 52, an operating oil exhaust port 59 communicating with the oil pan, a hydraulic port 60 communicating with the hydraulic chamber 35 shown in FIG. 4, and a hydraulic port 61 communicating with the hydraulic chamber 36.

The operating oil in the hydraulic chambers 35, 36 is changed in quantity as the opening degree of the associated hydraulic port is changed by the sliding of the spool 55. The opening degree is determined by the value of current supplied to the linear solenoid 56.

According to this embodiment, the controller 70 applies a control signal to a current controller by selecting one of the two duty factors, for example, 90% and 10%. A current corresponding to the particular duty factor is supplied from the current controller to the linear solenoid 56. The related condition of the spool valve 53 is shown in FIGS. 5A and 5B.

Figure 5A:
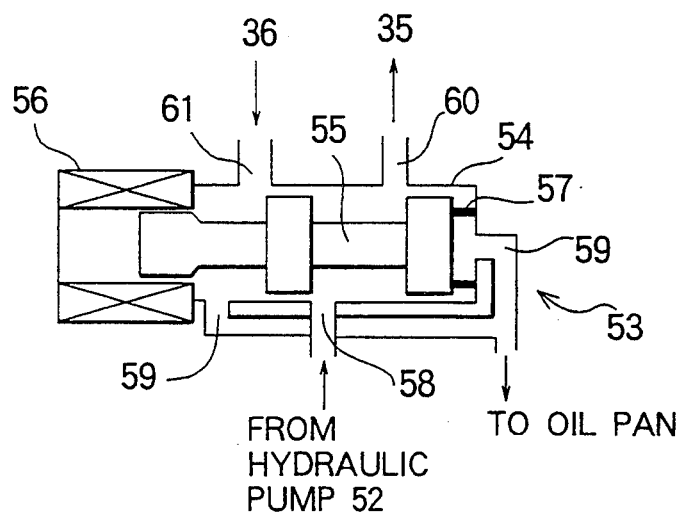
FIG. 5A is a sectional view showing the spool valve condition with the duty factor of 90% for the regulation apparatus shown in FIG. 3.

FIG. 5A shows an example with the 90% duty factor of the control signal in the controller 70, in which the spool 55 is driven to the extreme right of the cylinder by the linear solenoid 56, so that communication is established both between the supply port 58 and the hydraulic port 60 and between the hydraulic port 61 and the exhaust port 59. Under this condition, the cylinder 34 in FIG. 4 moves rightward in the drawing, and by the thrust force generated by the helical splines 32b, 33b, the phase of the camshaft 16 advances with respect to the sprocket 13 thereby to effect advance control.

Figure 5B:
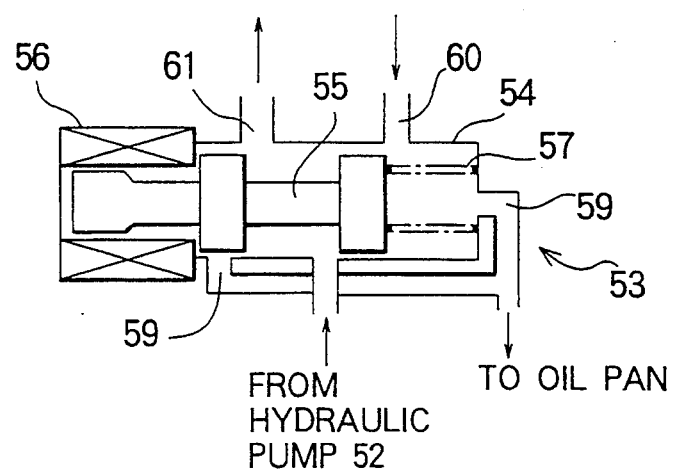
FIG. 5B is a similar diagram associated with the duty factor of 10%.

FIG. 5B represents the case associated with the duty factor of 10%, in which the spool 55 is urged to the leftmost end of the cylinder by the spring 57, so that communication is established between the supply port 58 and the hydraulic port 61 and between the hydraulic port 60 and the exhaust port 59. In the process, the hydraulic chamber 36 is supplied with the operating oil, while the operating oil is drained from the hydraulic chamber 35, with the result that the cylinder moves leftward in the drawing, thereby retarding the phase of the camshaft 16 with respect to the sprocket 13 for effecting retard control.

Now, the controller 70 will be explained.

The controller 70 applies what is called the bang-bang control to the valve operation timing regulation. A control value is set from the region free of the effect of the variations of the spool valve operation in such a manner as to selectively output a control value in accordance with a predetermined control rule described below.

Figure 6:
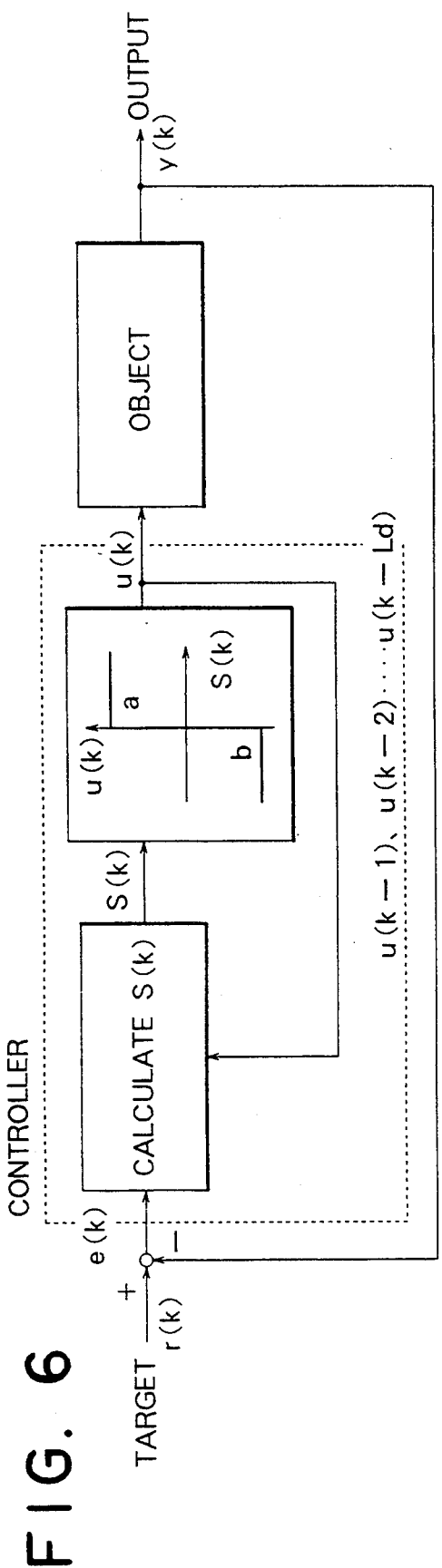
FIG. 6 is a block diagram showing a control system for the regulation apparatus of FIG. 3.
Figure 7:
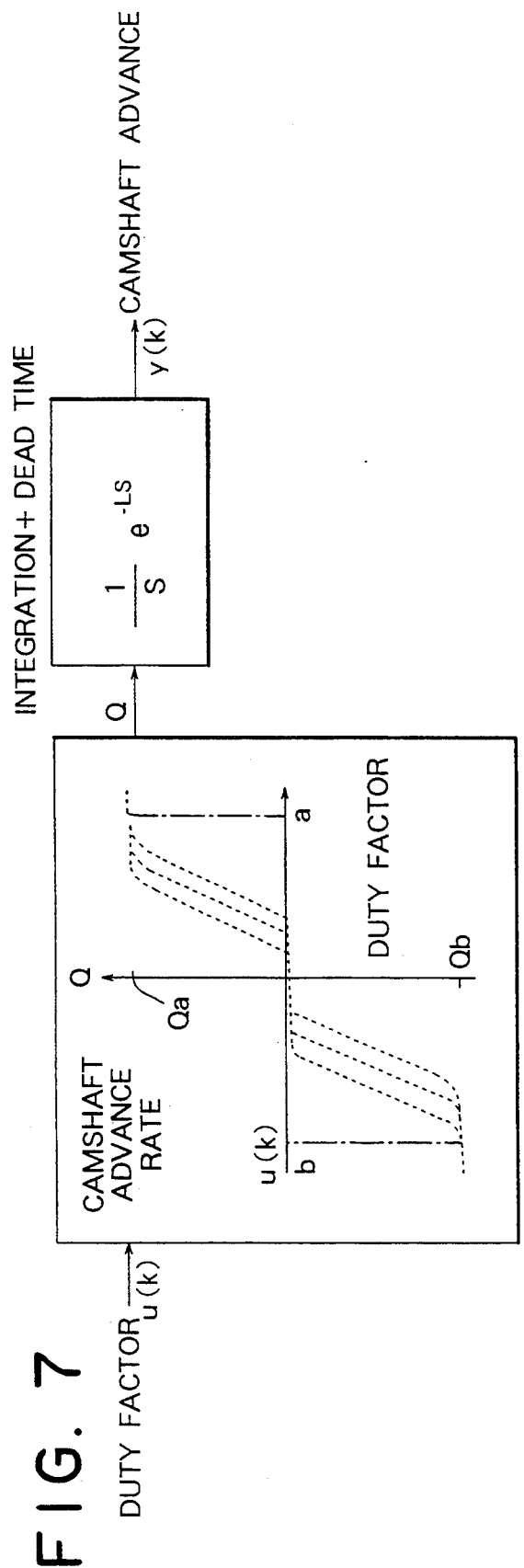
FIG. 7 is a block diagram showing an object of control of FIG. 6.

The particular control system is shown in FIG. 6, and an object to be controlled by the control system in FIG. 7.

FIG. 6 shows a control system implemented in the control unit 70. The operation value u(k) produced from a controller is binary and assumes a for the direction of advance, and b for the direction of retardation. The controller executes the binary control according to the control rule of a discrete time system as described below.

When $s(k) \geq 0$, $u(k) = a$

When $s(k) < 0$, $u(k) = b$ where k is a sampling time, point, and s(k) a switching condition. The switching condition s(k), as described later, is calculated using the present error e(k) and the operating values u(k−1), u(k−2), ... for previous controls. Also, a and b are operating values set from each region where variations in spool valve operation have no effect on the control. With the object of control shown in FIG. 7, these values are set from the region where the camshaft advance rate is saturated, and are expressed in duty factor.

With the object of control shown in FIG. 7, the input u(k) is a pulse width modulation (PWM) signal in terms of duty factor, and the output y(k) a camshaft advance. The region where the camshaft advance rate is saturated exists along the directions of both the advance and retard operations. The camshaft advance rates Qa, Qb associated with the u(k) of a and b are determined by the pressure of the hydraulic pump 52 supplying the operating oil to the hydraulic chambers 35, 36 and are not affected by the manufacturing error of the spool 53. The use of a and b as the operating value u(k), therefore, assures an accurate valve operation control.

The control system for the valve operation timing regulation according to the embodiment includes an integrating element as a hydraulic mechanism is constructed as an object of control, and therefore the control operation is executed taking the integrating element into consideration.

The object of control has a behavior as expressed by $$Y(k+1) = Y(k) + q(k-Ld) \qquad (3)$$

where k is a sampling time point, and Ld the number of samples corresponding to the "dead time".

The function q(k) in equation (3) is a control amount derived from the control rule of equation (4) when the sampling period is given as st, the camshaft advance rates Qa, Qb, and the advances $q_a$, $q_b$ as st×Qa and st×Qb, respectively.

$$q(k) = \begin{cases} q_a & \text{when } u(k) = a \\ q_b & \text{when } u(k) = b \end{cases} \qquad (4)$$

The function q(k) thus calculated is used for calculating the switching condition s(k) as described below.

The equation (5) representing the relation between the target value r(k), the output y(k) and the error e(k) is substituted into equation (3), assuming that the target value r(k) is constant. Then, equation (6) is obtained.

$$e(k) = y(k) - r(k) \qquad (5)$$

$$e(k+1) = e(k) - q(k-Ld) \qquad (6)$$

The switching condition s(k) is set as $$\dot{s}(k) = e(k+Ld) \qquad (7)$$

More specifically, assuming that the present sampling time point is k, e(k+Ld) gives a predicted value. When equation (7) is developed with e*(k+Ld) as a predicted value of e(k+Ld), equation (8) is obtained.

$$\begin{aligned} e(k+Ld) &= e(k+Ld-1) - q(k-1) \\ &= e(k+Ld-2) - [q(k-1) + q(k-2)] \\ &= \ldots \\ &= e(k) - [q(k-1) + q(k-2) + \ldots \\ &\quad + q(k-Ld)] \end{aligned} \qquad (8)$$

Assume, for example, that the "dead time" is determined by experiments and the number Ld of samples corresponding to the dead time is obtained as Ld=6. The switching condition s(k) is given by equation (9).

$$\begin{aligned} s(k) &= e^*(k+6) \\ &= e(k) - [q(k-1) + q(k-2) + \ldots + q(k-6)] \end{aligned} \qquad (9)$$

In this way, the switching condition s(k), i.e., the predicted value e*(k+6) can be determined on the basis of the present control error e(k) and the control amounts q(k−1) to q(k−6) corresponding to the previous operating values u(k−1) to u(k−6).

More specifically, the number Ld of samples is determined from the "dead time" of the control system, and the switching condition s(k) is calculated on the basis of equation (9) for application of the control rule. The tracking control is thus possible while taking the integrating element into consideration without being affected by the variation of the spool valve.

Figure 8:
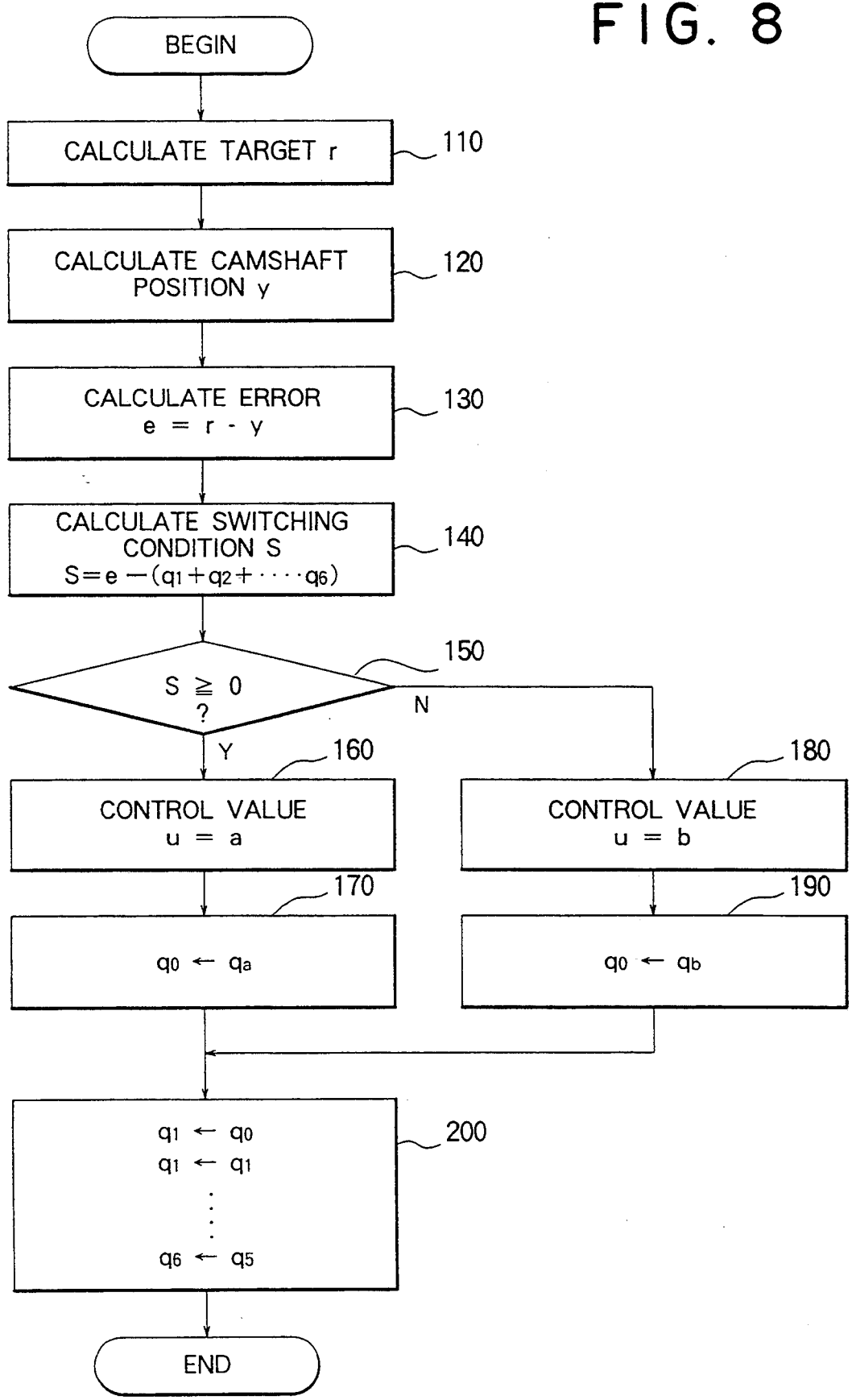
FIG. 8 is a control flowchart for the regulation apparatus shown in FIG. 3.

FIG. 8 is a flowchart showing the particular control. Step 110 grasps the engine operating conditions and determines a target camshaft advance angle r on the basis of the engine cooling water temperature signal, the throttle opening degree signal, etc. Step 120 calculates the present camshaft advance y from the signals of the crankshaft position sensor and the camshaft position sensor. Step 130 calculates the error e from these values. Step 140 calculates the switching condition s(k) on the basis of the present error e and the camshaft advance q due to the operating value u in accordance with equation (9).

Step 150 decides the switching condition s(k) according to the control rule.

In the case where s(k)≧0, i.e., in the case where the camshaft angle is controlled in advance direction, step 160 is executed, so that the operating value u is determined with the duty factor a and applied to the linear solenoid of the spool valve.

In the case where s(k)<0, i.e., when the camshaft angle is controlled in the retard direction, on the other hand, step 180 is executed. The operating value u is thus determined with the duty factor b and applied to the linear solenoid.

In either case, after the output of the operating value, the camshaft advance $q_0$ (a negative advance $q_0$ for retardation) displaced by the present control output is stored temporarily (steps 170, 190). Then, step 200 shifts the contents of the memory storing the advance q one by one in the order of control executed previously, thereby updating the advance by the number of samples in the order of control starting from the latest one. The advance q updated and stored in the order of control is used for calculating the switching condition s(k) for determining the next operating value.

Figure 9:
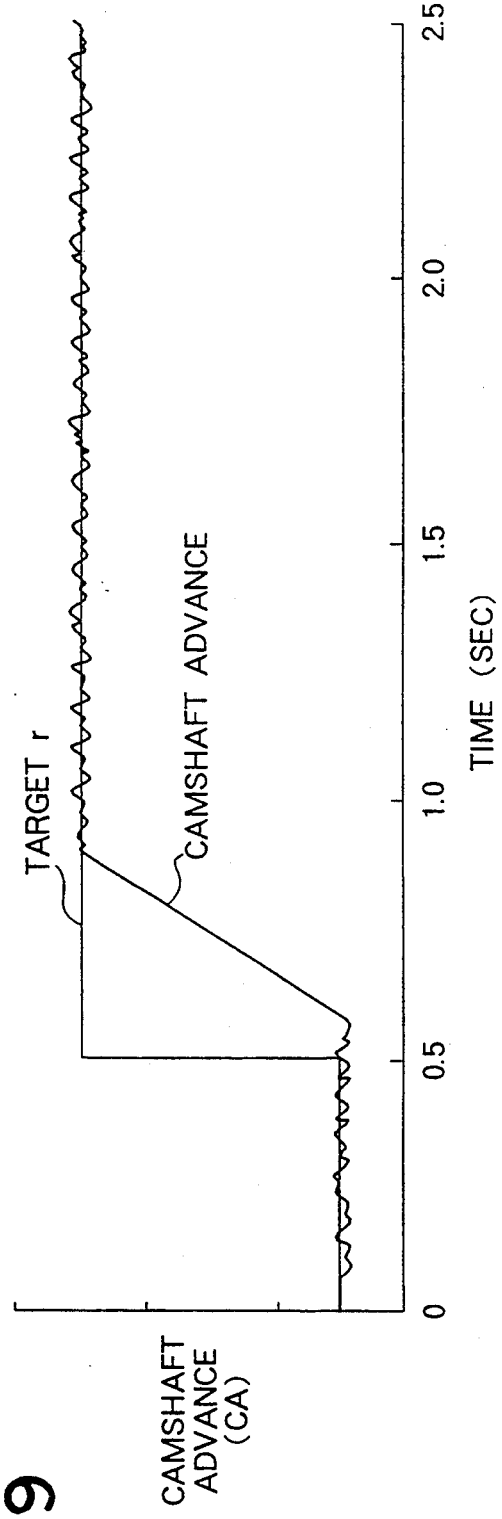
FIG. 9 is a time chart obtained by execution of advance control of the intake valve for the regulation apparatus shown in FIG. 3, in which (A) shows the relationship between a target value and an actual value and (B) the change of the operation value u.
Figure 9:
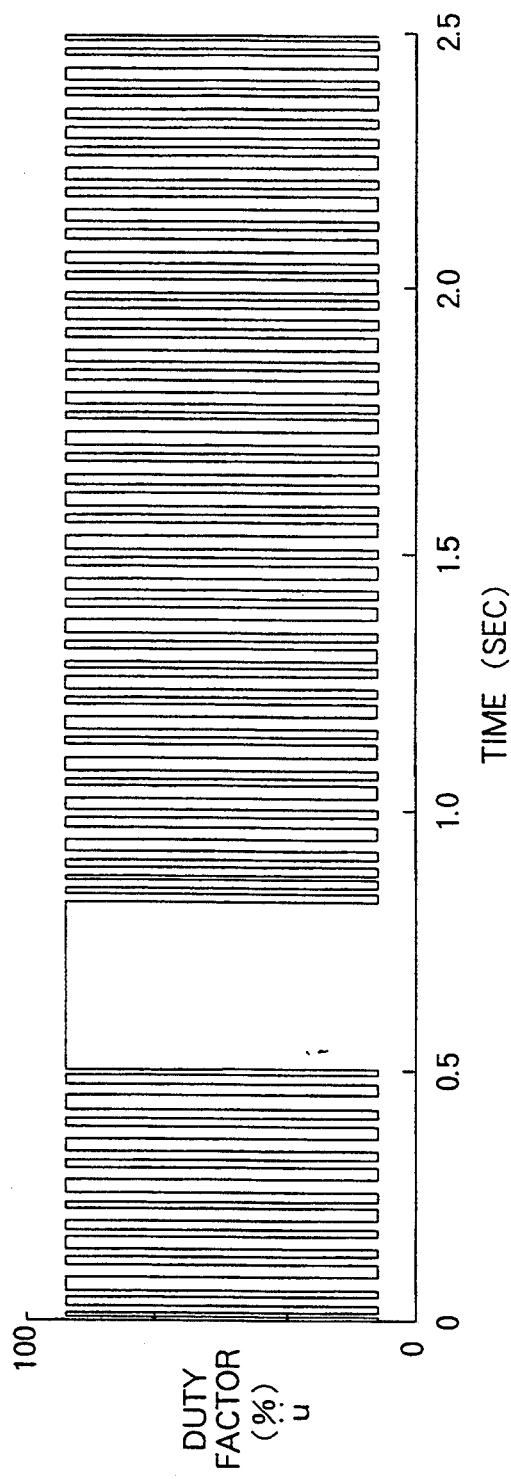

A time chart associated with the advance control of the intake valve with this control operation executed by the above-mentioned operation is shown in FIG. 9.

In FIG. 9, (A) shows the relation between a target value r and an actual value y, and (B) the change in the operating value u for the above-mentioned control operation. As will be seen from the diagrams, the camshaft advance rises sharply immediately before reaching a target value without any overshoot or steady error. In the prior art, in order to hold the camshaft advance as controlled after reaching a target, the operating value in the vicinity of the advance duty factor da, for example, located in the region where the solenoid valve is subjected to variations is produced. In the control apparatus according to the invention, in contrast, no control value is produced for holding the advance. In other words, it is seen that even when the duty factors da, dr are unknown, the valve operation timing control is accomplished.

Although the duty factors of the operating values a, b are 90% and 10% respectively in the cases described above, they may be replaced by on-off values with equal effect.

It will thus be understood from the foregoing description that according to the invention, the control operation is performed using an operating value set from the region free of the effect of variations of the solenoid operation, thereby realizing a very high controllability. Also, the manufacturing error for the solenoid valve is not required to be reduced for the control on the one hand, and the expensive circuit configuration conventionally used for compensating for the variations due to the solenoid valve is eliminated on the other hand. Thus, an accurate, rapid valve operation timing regulation is realized without increasing the apparatus cost.

As a result, the proper air intake and exhaust operations are performed in accordance with the engine operating conditions, thereby improving the intake efficiency and the exhaust efficiency.

We claim:

1. A valve operation timing regulation apparatus for changing the rotational phase between the crankshaft and the camshaft in the internal combustion engine by driving a member interposed between said two shafts by an actuator and thereby changing the operation timing of a valve driven by the camshaft, comprising:

various sensors for detecting various conditions of various parts of the internal combustion engine;

means for determining the operating conditions of the internal combustion engine in response to detection signals from said sensors and determining a current target value of the rotational phase in accordance with said operating conditions;

means for measuring an actual value of the rotational phase on the basis of the detection signals from said sensors;

error detection means for computing phase difference between said current target value and said actual value;

control means for selecting a current control value from a plurality of control values predetermined in a stable operation region of said actuator and applying said control value to said actuator; and means for storing selected one of the generated control value thus generated and control amount corresponding to said control value;

wherein said control means determines current control condition using the computed phase difference, previous control amounts stored in said storing means and selectively produces the control value on the basis of the current control condition.

2. A valve operation timing regulation apparatus according to claim 1, wherein said actuator includes a hydraulic actuator having a linear solenoid valve with the opening degree thereof changing linearly in accordance with a duty signal, and the control values of the control means are two including minimum and maximum values of the duty factor of the duty signal.

3. A valve operation timing regulation apparatus according to claim 2, wherein the minimum value of said duty factor is substantially 10% and the maximum value of said duty factor is substantially 90%.

4. A valve operation timing regulation apparatus according to claim 2, wherein said linear solenoid valve comprises a switching valve for switching the oil pressure in different directions at 50% of the duty factor of the duty signal thereby to switch the valve operation timing between advance and retard directions.

5. A valve operation timing regulation apparatus according to claim 1, further comprising:

means for determining a current target value of rotation advance angle of said crankshaft on basis of detection signals of a water temperature sensor and a throttle opening sensor among said various sensors;

means for computing an actual value of rotation phase angle of said crankshaft on basis of detection signals of a crank shaft position sensor and a cam shaft position sensor among said various sensors;

means for computing a parameter $s(k)$ of control switching condition from the computed phase difference $e(k)$ and data of previous control amounts $q(k)$ stored in said storing means with $s(k)=e(k)-(q(k-1)-q(k-2)--)$ and "k" indicating number of previous computing operations;

means for determining the current control value by selecting one of predetermined duty ratios of the actuator drive signal in dependence upon the computed parameter $s(k)$; and means for updating data stored in said storing means by the determined current control value.

* * * * *